No. 784,091. PATENTED MAR. 7, 1905.
B. F. WILLIAMSON.
GRAINING TANK FOR FATS.
APPLICATION FILED MAY 28, 1902.
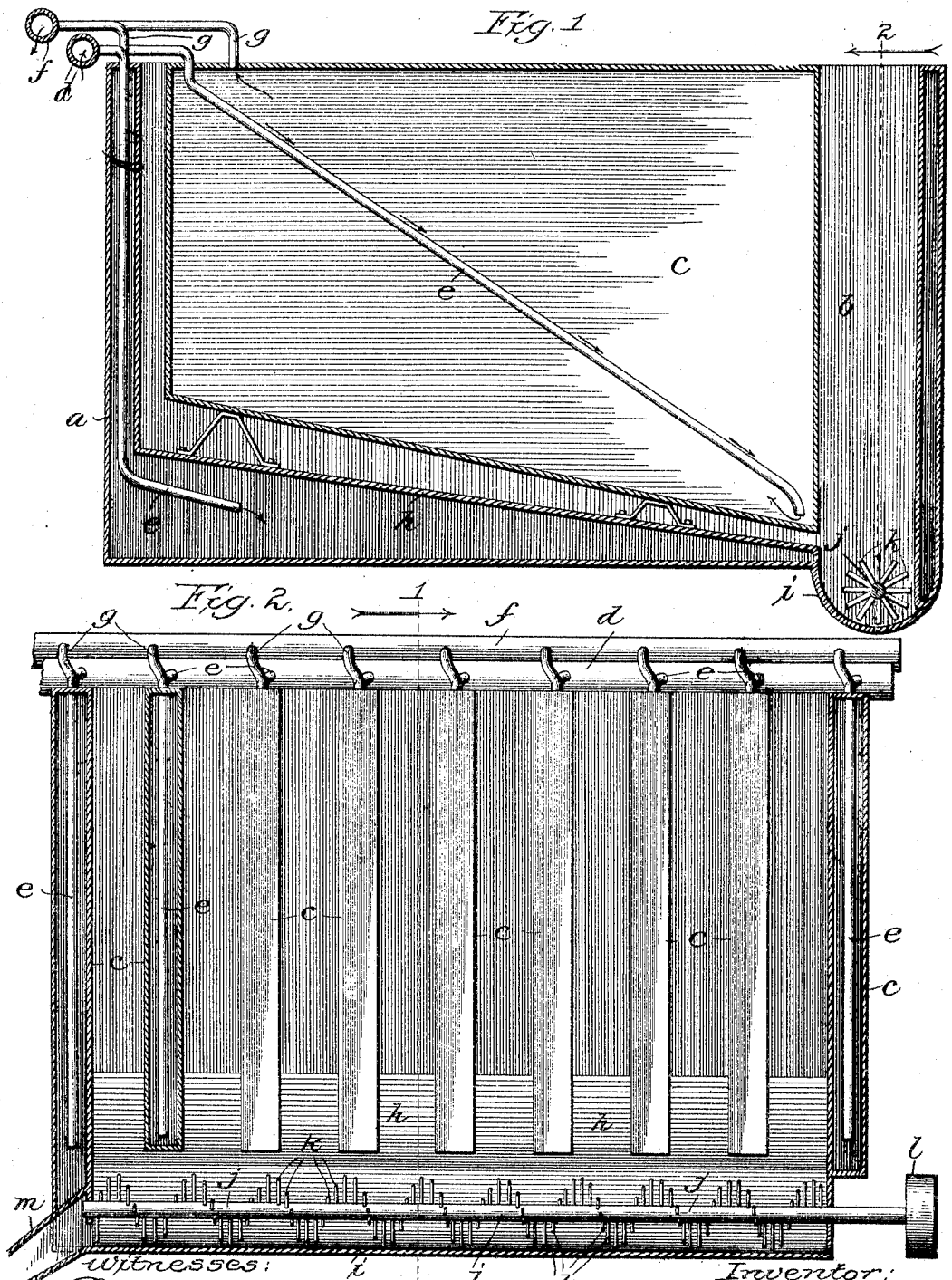

No. 784,091.       Patented March 7, 1905.

UNITED STATES PATENT OFFICE.

BAILEY F. WILLIAMSON, OF CHICAGO, ILLINOIS.

GRAINING-TANK FOR FATS.

SPECIFICATION forming part of Letters Patent No. 784,091, dated March 7, 1905.

Application filed May 28, 1902. Serial No. 109,295.

*To all whom it may concern:*

Be it known that I, BAILEY F. WILLIAMSON, a citizen of the United States, residing at Chicago, in the county of Cook and State of Illinois, have invented certain new and useful Improvements in Graining-Tanks for Fats, of which the following is a specification.

This invention relates to that class of devices which is used for the purpose of cooling and graining fats, so as to crystallize the same preparatory to their being pressed, as will more fully hereinafter appear.

The principal object of the invention is to provide a simple, economical, and efficient graining-tank.

A further object of the invention is to provide a graining-tank with means by which the fats therein may be cooled or tempered as desired.

Further objects of the invention will appear from an examination of the drawings and the following description and claims.

The invention consists principally in a graining-tank for fats in which there is combined an exterior receptacle, a plurality of hollow partitions, and means for supplying and exhausting fluid thereto and therefrom.

The invention consists, further, in a graining-tank in which there is combined an exterior receptacle provided with hollow walls, a series of parallel hollow partitions arranged transversely thereof, and means for supplying and exhausting fluid thereto and therefrom.

The invention consists, further and finally, in the features, combinations, and details of construction hereinafter described and claimed.

In the accompanying drawings, Figure 1 is a transverse sectional view of an apparatus constructed in accordance with these improvements, taken on line 1 of Fig. 2 looking in the direction of the arrow; and Fig. 2, a longitudinal sectional elevation taken on line 2 of Fig. 1 looking in the direction of the arrow.

In the art to which this invention relates it is well known that the fats which accumulate in stock-yards or places where cattle are prepared for the market are used for a variety of purposes and that preparatory to their being used they are melted, steamed, and rendered and must after such treatment be crystallized or tempered preparatory to the pressing out of the oils therefrom. The present method of crystallizing the fats takes considerable time, space, and labor, in that the treatment is necessarily very slow, the principal reason being that the fats must be tempered evenly—that is, reduced from their highest to their lowest temperature in a gradual and even manner, all of which facilitates the crystallizing of the same. The principal object of this invention, therefore, is to provide an apparatus or tank in which this tempering and crystallizing may be performed as quickly and economically as possible, all of which will more fully hereinafter appear.

In constructing an apparatus in accordance with these improvements I make a tank in which there is an exterior receptacle having hollow inclosing walls $a$ at the sides, ends, and bottom portion, the upper part being left open and which provides a tempering-chamber $b$. To facilitate the tempering of the fats and similar elements, a plurality of hollow partitions $c$ is provided, arranged transversely of the tank and in the tempering-chamber thereof. These hollow partitions are arranged parallel with each other at the desired distance apart and from the inclosing walls of the exterior receptacle and are capable, as well as the hollow walls, of receiving a quantity of cool or tempered water, brine, or steam, as the case may be, for the purpose of reducing the temperature of the heated fats in the tempering-chamber in an equable manner.

In order to provide means by which any of the fluids above named may be supplied to the hollow walls and partitions, a main supply-pipe $d$ is provided, having a plurality of pipes $e$ leading therefrom and into the chambers formed in the hollow walls and partitions and to the body portion thereof, as shown in the drawings. The fluid should necessarily be supplied to such hollow walls and partitions under desired pressure, so as to obtain a circulation therein and at the same time facilitate the exhaust therefrom. The necessary exhaust is accomplished by connecting such hollow walls and partitions with a main exhaust-pipe $f$ by means of a plurality of branch exhaust-pipes g, connected to the upper portions of such chambers. It will be understood, of course, that these hollow walls and partitions are hermetically sealed and that the only inlet or outlet is through the pipes, as above described.

When the fats have been tempered or crystallized to the desired amount, it is desirable to discharge the same. In order to facilitate this discharge, I prefer to make the bottom of the tank at an incline, as shown at h, Fig. 1, and at one side of the tank, in the bottom portion and at right angles to the dividing-partition, is a discharging-trough i, in which is rotatably mounted a helical conveyer formed of a rotatable shaft j, having a plurality or series of radially-extending pins or blades k. This shaft may be rotated in any desired manner by means of the pulley l, which may be connected with some prime mover. The pins are preferable to a single blade, in that they serve to break up the body of fat before it is discharged through the spout m.

The principal advantages incident to an apparatus constructed as above described are, first, that the tempering of the fat may be carried on in an equable manner either by supplying a cooling brine, cold or hot water, or steam to suit varying circumstances and conditions; second, that it takes about one-fourth of the space required at present, and, third, that one man or operator can accomplish from three to four times the work now accomplished, which means a large saving in time, labor, and expense, all of which will be understood and appreciated by those skilled in the art.

The hollow partitions c are here shown as independent cells mounted in the tempering-chamber b in such a manner as to leave a space on all sides of each cell and also at the bottom between the cell and the hollow inclosing wall. By this arrangement of the cells a greater surface area is exposed than would be the case if they abutted against the inclosing wall and bottom of the tank. It will be understood, however, that the cells may be mounted in position to abut against the side wall and the bottom of the tank without departing from the spirit of my invention.

The entire space inclosed within the hollow inclosing walls, including the sides, ends, and bottom, forms an integral chamber outside of the tempering-chamber and is inclosed at the top. It will therefore be readily understood that this chamber within the hollow wall may be extended beneath the trough i by simply making the bottom portion of such trough double instead of single and leaving a space between such double walls corresponding to that of the other portions of the outer walls. The inlet-pipe e may enter the chamber formed within the hollow wall at the bottom portion of the tank instead of at the top, as shown. These modifications being obvious, it is deemed unnecessary to illustrate them here, as an extended description and illustration thereof would only lead to confusion, prolixity, and ambiguity.

I claim—

1. In an apparatus of the class described, the combination of an exterior receptacle provided with hollow outer walls forming a tempering-chamber between the inner walls thereof, a series of hollow cells mounted inside the tempering-chamber and each having imperforate side and end walls entirely detached from the exterior receptacle and from each other, and means for supplying fluid to the cells and exhausting it therefrom, substantially as described.

2. In an apparatus of the class described, the combination of an exterior receptacle provided with hollow walls forming a tempering-chamber between the inner walls thereof, a series of hollow cells mounted inside the tempering-chamber formed by such inner walls and each having imperforate side walls entirely detached from the exterior receptacle and from each other, means for supplying fluid to the cells and exhausting it therefrom, means for supplying fluid to the space between the hollow walls of the exterior receptacle and exhausting it therefrom, and means for discharging the tempered fats, substantially as described.

3. In an apparatus of the class described, the combination of an exterior receptacle provided with hollow walls forming a tempering-chamber, a series of hollow partitions having imperforate adjacent sides arranged parallel with each other detached entirely from the exterior receptacle and from each other and at a distance from at least one of the inner side walls thereof forming a space between such partition and wall, means for supplying fluid to such hollow walls and partitions and exhausting it therefrom, and means for discharging the tempered fats, substantially as described.

4. In an apparatus of the class described, the combination of an exterior receptacle provided with hollow walls, a series of hollow partitions arranged transversely in the tempering-chamber of the receptacle parallel with each other and detached from the hollow walls, means for supplying fluid to such hollow walls and partitions and exhausting it therefrom, and a helical screw conveyer arranged adjacent to and near the bottom of the partitions at right angles thereto and within the exterior receptacle for discharging the tempered fats, substantially as described.

5. In an apparatus of the class described, the combination of an exterior receptacle provided with hollow walls forming a tempering-chamber, a series of hollow partitions arranged parallel with each other in the tempering-chamber of the receptacle and detached from the walls of such receptacle leaving all parts of the tempering-chamber connected, means for supplying fluid to such hollow walls and partitions and exhausting it therefrom, and a helical conveyer arranged near the bottom of such partitions and within the exterior receptacle formed of a series or plurality of radially-extending pins or beaters for discharging the tempered fats, substantially as described.

6. In an apparatus of the class described, the combination of an exterior receptacle having hollow walls forming a tempering-chamber, a series of hollow partitions arranged in the tempering-chamber thereof and parallel with each other and at a distance from at least one side wall of the tempering-chamber leaving all parts of such chamber connected, means for supplying fluid to such hollow walls and partitions and exhausting it therefrom, a trough at one side of the lower portion of the receptacle at right angles to the hollow partitions, and a helical conveyer formed of a rotatable shaft having a series of radially-extending pins or beaters arranged in such trough for discharging the tempered fats, substantially as described.

B. F. WILLIAMSON.

Witnesses:
P. ALFRED NYSTROM,
H. G. BITTERS.